United States Patent
Navarro et al.

(10) Patent No.: US 10,041,809 B2
(45) Date of Patent: Aug. 7, 2018

(54) AIRCRAFT INTENT PROCESSOR

(71) Applicant: The Boeing Company, Chicago, IL (US)

(72) Inventors: Francisco Navarro, Madrid (ES); Carlos Querejeta, Madrid (ES); Ernesto Valls Hernandez, Madrid (ES); Francisco Garcia de Blanes, Madrid (ES); Luis D'Alto, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/499,638

(22) Filed: Apr. 27, 2017

(65) Prior Publication Data

US 2017/0227377 A1    Aug. 10, 2017

Related U.S. Application Data

(62) Division of application No. 14/639,765, filed on Mar. 5, 2015, now Pat. No. 9,658,623.

(30) Foreign Application Priority Data

Mar. 7, 2014    (EP) .................................... 14382083

(51) Int. Cl.
*G06F 7/70*    (2006.01)
*G01C 23/00*    (2006.01)
(Continued)

(52) U.S. Cl.
CPC ............ *G01C 23/00* (2013.01); *B64C 39/024* (2013.01); *G05D 1/101* (2013.01); *G08G 5/0069* (2013.01); *G08G 5/04* (2013.01)

(58) Field of Classification Search
CPC .. G05D 1/0027; G05D 1/0033; G05D 1/0038; G05D 1/0044; G05D 1/0238;
(Continued)

(56) References Cited

U.S. PATENT DOCUMENTS 3,940,597 A * 2/1976 DiMatteo ............. G01C 21/005
                                                342/456
8,744,649 B2    6/2014 Magana Casado et al.
(Continued)

FOREIGN PATENT DOCUMENTS

EP          2482269         8/2012
WO       2009042405        4/2009
WO       2015101848        7/2015

OTHER PUBLICATIONS

Vilaplana et al., "Towards a Formal Language for the Common Description of Aircraft Intent," Proceedings of the 24th Digital Avionics Systems Conference, Washington DC, USA, Oct. 2005. Published by the Institute of Electrical and Electronic Engineers, Inc (IEEE), 9 pages.
(Continued)

*Primary Examiner* — Muhammad Shafi
(74) *Attorney, Agent, or Firm* — Hanley, Flight & Zimmerman, LLC

(57) ABSTRACT

Example aircraft intent processors are described herein that can be used both for the prediction of an aircraft's trajectory from aircraft intent, and the execution of aircraft intent for controlling the aircraft. An example aircraft intent processor includes an aircraft intent input to receive aircraft intent data representative of aircraft intent instructions, an aircraft state input to receive state data representative of a state of the aircraft, and a residual output. The aircraft intent processor is to calculate residual data representative of an error between a state of the aircraft commanded by the received aircraft intent data and the state of the aircraft expressed by received state data, and output the residual data via the residual output.

16 Claims, 6 Drawing Sheets

(51) Int. Cl.
  *G05D 1/10* (2006.01)
  *G08G 5/04* (2006.01)
  *B64C 39/02* (2006.01)
  *G08G 5/00* (2006.01)

(58) Field of Classification Search
  CPC ...... G05D 1/0246; G05D 1/027; G05D 1/101;
       G08G 1/096877; G08G 1/096855; G08G
       1/123; G08G 3/00; G08G 5/0004; G08G
       5/0052; G08G 5/0091; G08G 5/0069;
       G08G 5/04; G01C 23/00; B64C 39/024
  USPC .................. 701/14, 11, 15, 3, 4, 23, 24, 27
  See application file for complete search history.

(56) References Cited

U.S. PATENT DOCUMENTS

| | | | |
|---|---|---|---|
| 2010/0305781 A1* | 12/2010 | Felix | G05D 1/101 |
| | | | 701/3 |
| 2011/0062942 A1 | 3/2011 | Karbula et al. | |
| 2012/0290154 A1 | 11/2012 | Lopez Leones et al. | |
| 2014/0229094 A1 | 8/2014 | La Civita et al. | |
| 2014/0336932 A1 | 11/2014 | Leones et al. | |
| 2015/0057915 A1 | 2/2015 | La Civita | |
| 2015/0134286 A1* | 5/2015 | Chao | G01N 21/9501 |
| | | | 702/82 |
| 2015/0170523 A1 | 6/2015 | La Civita et al. | |
| 2015/0251756 A1 | 9/2015 | Perez Villar et al. | |

OTHER PUBLICATIONS

López-Leonés et al., "The Aircraft Intent Description Language: A Key Enabler for Air/Ground Synchronization in Trajectory-Based Operations," Proceedings of the 26th Digital Avionics Systems Conference, Dallas, USA, Oct. 2007. Published by the Institute of Electrical and Electronic Engineers, Inc (IEEE), 12 pages.

European Patent Office, "Extended European Search Report," issued in connection with European Patent Application No. 14382083.5, dated Jul. 15, 2014, 8 pages.

United States Patent and Trademark Office, "Notice of Allowance and Fee(s) Due," issued in connection with U.S. Appl. No. 14/639,765, dated Jan. 17, 2017, 34 pages.

United States Patent and Trademark Office, "Non-Final Office Action," issued in connection with U.S. Appl. No. 14/639,765, dated Sep. 26, 2016, 27 pages.

United States Patent and Trademark Office, "Restriction and/or Election Requirement," issued in connection with U.S. Appl. No. 14/639,765, dated May 13, 2016, 7 pages.

GPDS Politecnica, "ATLANTIDA: aplicacion de tecnologia lider a aeronaves no tripuladas para la investigacion y desarrollo en atm, cdti," retrieved from [http://www.grpss.ssr.upm.es/index.php/es/technologies-and-systems-for . . . ] on Mar. 5, 2015, 3 pages.

European Patent Office, "Communication pursuant to Article 94(3) EPC," issued in connection with European Patent Application No. 14382083.5, dated Dec. 17, 2014, 5 pages.

\* cited by examiner

| Types | Group | | | Instruction | | |
|---|---|---|---|---|---|---|
| | No. | Keyword | Name | No. | Keyword | Name |
| Motion instructions | 1 | SG | Speed guidance | 1 | SL | Speed law |
| | | | | 2 | HS | Hold speed |
| | 2 | HSG | Horizontal speed guidance | 3 | HSL | Horizontal speed law |
| | | | | 4 | HHS | Hold horizontal speed |
| | 3 | VSG | Vertical speed guidance | 5 | VSL | Vertical speed law |
| | | | | 6 | HVS | Hold vertical speed |
| | 4 | PAG | Path angle guidance | 7 | SPA | Set path angle |
| | | | | 8 | PAL | Path angle law |
| | | | | 9 | HPA | Hold path angle |
| | 5 | LAG | Local altitude guidance | 10 | AL | Altitude law |
| | | | | 11 | HA | Hold altitude |
| | 6 | VPG | Vertical positional guidance | 12 | TVP | Track vertical path |
| | 7 | TC | Throttle control | 13 | ST | Set throttle |
| | | | | 14 | TL | Throttle law |
| | | | | 15 | HT | Hold throttle |
| | | | | 16 | OLT | Open loop throttle |
| | 8 | LDC | Lateral directional control | 19 | SBA | Set bank angle |
| | | | | 20 | BAL | Bank angle law |
| | | | | 21 | HBA | Hold bank angle |
| | | | | 22 | OLBA | Open loop bank angle |
| | 9 | DG | Directional guidance | 17 | CL | Course law |
| | | | | 18 | HC | Hold course |
| | 10 | LPG | Lateral positional guidance | 23 | THP | Track horizontal path |
| Configuration instructions | 11 | HLC | High lift configuration | 24 | SHL | Set high lift devices |
| | | | | 25 | HLL | High lift devices law |
| | | | | 26 | HHL | Hold high lift devices |
| | 12 | SBC | Speed brakes configuration | 27 | SSB | Set speed brakes |
| | | | | 28 | SBL | Speed brakes law |
| | | | | 29 | HSB | Hold speed brakes |
| | 13 | LGC | Landing gear configuration | 30 | OLSB | Open loop speed brakes |
| | | | | 31 | SLG | Set landing gear |
| | | | | 32 | HLG | Hold landing gear |

*FIG. 1*

AIRCRAFT INTENT PROCESSOR

RELATED APPLICATION

This patent arises from a divisional of U.S. application Ser. No. 14/639,765, titled "An Aircraft Intent Processor," filed Mar. 5, 2015, which claims priority to European Patent Application No. 14382083.5, titled "An Aircraft Intent Processor," and filed Mar. 7, 2014. U.S. application Ser. No. 14/639,765 and European Patent Application No. 14382083.5 are hereby incorporated by this reference in their entireties.

FIELD OF THE INVENTION

The present disclosure relates to a processor and, more particularly, to an aircraft intent processor that can be used both for the prediction of an aircraft's trajectory from aircraft intent, and the execution of aircraft intent for controlling the aircraft.

BACKGROUND

The ability to predict an aircraft's trajectory is useful for several reasons.

Air traffic management (ATM) would benefit from an improved ability to predict an aircraft's trajectory. ATM is responsible for the safe separation of aircraft, a particularly demanding task in congested airspace such as around airports. ATM decision-support tools based on accurate trajectory predictions could allow a greater volume of aircraft to be handled while maintaining safety. Trajectory is a four-dimensional description of the aircraft's path. The description may be the evolution of the aircraft's state with time, where the state may include the position of the aircraft's center of mass and other aspects of the aircraft's motion such as velocity, attitude and weight. This benefit is particularly significant where ATM is operating in and around airports. As demand for slots at airports increases, ATM is under constant pressure to increase capacity by decreasing separation between aircraft; increased accuracy in predicting aircraft trajectories enables this to be done without compromising safety. Also, greater predictability in aircraft trajectories allows arrival times to be determined more accurately, thereby enabling better coordination with ground operations.

In current ATM practice, aircraft must typically fly set routes. For example, when approaching and departing an airport, aircraft are usually requested to fly a Standard Terminal Arrival Route (STAR) and a Standard Instrument Departure (SID), respectively. However, aircraft operators are increasingly requesting additional flexibility to fly according to their preferences, so that they can better pursue their business objectives. Furthermore, there is an increasing pressure on the ATM system to facilitate the reduction of the environmental impact of aircraft operations. As a result of the above, the ATM system requires the capability to predict operator-preferred trajectories as well as trajectories that minimize the impact on the environment, particularly in terms of noise and emissions. In addition, the ATM system must be able to exchange descriptions of such trajectories with the operators in order to arrive at a coordinated, conflict-free solution to the traffic problem.

The ability to predict an aircraft's trajectory would also be beneficial to the management of autonomous vehicles such as unmanned air vehicles (UAVs), for example in programming flight plans for UAVs as well as in commanding and de-conflicting their trajectories.

International PCT Patent Publication WO2009/042405 describes the general concepts of aircraft intent and flight intent, and the computer-implemented application of those concepts in formal languages, referred to as the aircraft intent description language (AIDL) and the flight intent description language. WO2009/042405 is hereby incorporated by reference in its entirety.

European Patent Application EP2482269, which is also in the name of The Boeing Company, describes flight intent in more detail. EP2482269 is hereby incorporated by reference in its entirety.

SUMMARY

An aircraft intent processor is disclosed herein. In some examples, the processor can calculate residual data representative of error in a state of an aircraft (e.g., location, speed, and attitude) as compared with that instructed by aircraft intent instructions.

Such processors can advantageously be used in both flight control systems for controlling aircraft, and also in air traffic control systems for monitoring aircraft, which results in better correspondence between actual trajectory achieved by an aircraft following the aircraft intent instructions and prediction of an aircraft's trajectory by air traffic control using the same aircraft intent instructions.

An example apparatus disclosed herein includes an aircraft intent processor having an aircraft intent input to receive aircraft intent data representative of aircraft intent instructions, an aircraft state input to receive state data representative of a state of an aircraft, and a residual output. The aircraft intent processor is to calculate residual data representative of an error between a state of the aircraft commanded by the aircraft intent data and the state of the aircraft expressed by the state data and output the residual data via the residual output.

An example system disclosed herein includes an aircraft having an actuator and a first aircraft intent processor and an air traffic control station to monitor the aircraft. The air traffic control station has a second aircraft intent processor. Aircraft intent data representative of aircraft intent instructions is received by the aircraft and the air traffic control station. The aircraft is to execute the aircraft intent instructions using the first aircraft intent processor. In the example system, the first aircraft intent processor includes a first aircraft intent input to receive the aircraft intent data, a first aircraft state input to receive first state data representative of a first state of the aircraft, and a first residual output. The first aircraft intent processor is to calculate first residual data representative of a first error between a state of the aircraft commanded by the received aircraft intent data and the first state of the aircraft expressed by the first state data and output the first residual data via the first residual output. In the example system, the air traffic control station is to predict the trajectory of the aircraft using the second aircraft intent processor.

Disclosed herein is an example method of controlling an aircraft or predicting a trajectory of the aircraft using an aircraft intent processor that includes an aircraft intent input, an aircraft state input, and a residual output. The example method includes receiving, with the aircraft intent input, aircraft intent data representative of aircraft intent instructions, receiving, with the aircraft state input, state data representative of a state of the aircraft, calculating residual data representative of an error between a state of the aircraft commanded by the received aircraft intent data and the state of the aircraft expressed by the received state data, and outputting the residual data via the residual output.

BRIEF DESCRIPTION OF THE DRAWINGS

FIG. 1 illustrates a set of example instructions that may be used to describe aircraft intent.

DETAILED DESCRIPTION

Figure 2:
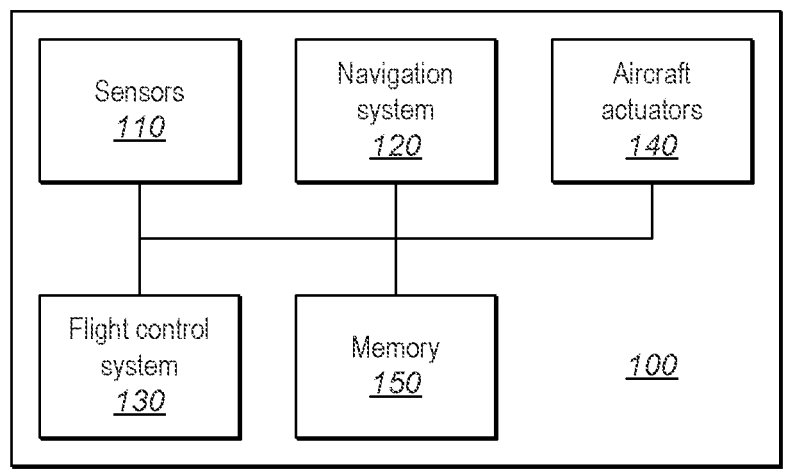
FIG. 2 illustrates an example schematic representation of an aircraft having an example flight control system.

Before describing the details of the present disclosure, a brief overview of the concept of aircraft intent is provided. Aircraft intent is a description of how an aircraft is to be flown during a time interval. Aircraft intent includes a set of instructions having configuration instructions that describe the aerodynamic configuration of the aircraft (e.g., the positioning of flaps, slats, rudders and/or elevators) and motion instructions that describe the motion of the aircraft (e.g., in terms of speeds and accelerations).

The aircraft intent instructions must comply with a set of rules to ensure that the configuration instructions correctly define the aerodynamic configuration of the aircraft and that the motion instructions close the degrees of freedom of equations of motion used to describe the aircraft motion.

International PCT Patent Publication WO2009/042405 describes an expression of a set of aircraft intent instructions in a formal language, aircraft intent description language (AIDL), which defines the trajectory of the aircraft. This expression is used by the trajectory computation engine to solve the equations of motion that govern the aircraft's motion.

There are many different sets of equations of motion that describe an aircraft's motion known to those of ordinary skill in the art. The sets of equations generally differ due to their complexity. In principle, any of these sets of equations may be used. The actual form of the equations of motion influences how the AIDL should be formulated because variables that appear in the equations of motion also appear in the instructions defining the aircraft intent.

The set of equations of motion may describe the motion of the aircraft's center of gravity, with the aircraft considered as a mass-varying rigid solid. Three coordinates may describe the position of the aircraft's center of mass (longitude, latitude and altitude) and three values may describe the aircraft's attitude (roll, pitch and yaw). To derive the equations, a set of simplifying assumptions may be applied to the general equations describing atmospheric, powered flight.

The equations of motion include variables relating to the aircraft's performance and meteorological conditions, and these are provided by the aircraft performance model and an earth model. To solve the equations, the configuration of the aircraft must be specified. For example, information may be required to resolve the settings of the landing gear, speed brakes and high lift devices.

International PCT Patent Publication WO2009/042405 describes using equations of motion that form a system of seven non-linear ordinary differential equations, along with a definition of a given aircraft configuration comprising landing gear setting, high-lift devices settings and speed brakes setting, that have one independent variable (time), ten dependent variables and hence three mathematical degrees of freedom (i.e., the number of dependent variables less the number of equations). Thus, this choice of the equations of motion means that it is necessary to define externally the three degrees of freedom to obtain a closed solution thereby defining the aircraft trajectory unambiguously, plus three further degrees of freedom to define the aircraft's configuration (the landing gear, speed brakes and high-lift devices inputs must be closed at any time to obtain the trajectory).

The AIDL is a formal language whose primitives are the instructions. The grammar of the formal language provides the framework that allows instructions to be combined into sentences that describe operations. Each operation contains a complete set of instructions that close the required six degrees of freedom in the equations of motion and so unambiguously defines the aircraft trajectory over its associated operation interval.

Instructions may be thought of as indivisible pieces of information that capture basic commands, guidance modes and control inputs at the disposal of the pilot and/or the flight management system. Each instruction may be characterised by three main features: the effect of an instruction; the meaning of an instruction; and the execution interval.

The effect of an instruction is defined by a mathematical description of the instruction's influence on the aircraft's motion. The instruction is expressed as a mathematical equation that must be fulfilled along with the equations of motion during the instruction's execution interval.

The meaning of an instruction is given by the instruction's intrinsic purpose and is related to the operational purpose of the command, guidance mode or control input captured by the instruction.

The execution interval is the period during which the instruction is affecting the aircraft's motion (i.e., the time during which the equations of motion and the instruction's effect must be simultaneously satisfied). In some examples, the execution of different instructions may overlap, and such instructions are said to be compatible. In some examples, other instructions are incompatible, and so cannot have overlapping execution intervals (e.g., instructions that cause a conflicting requirement for the aircraft to ascend and descend).

The instructions are divided into groups, with the division primarily focussing on the effect of the instructions, and then on grouping incompatible instructions together, as illustrated in FIG. 1. At a top level, the instructions are divided into two groups: configuration instructions 270; and motion instructions 260.

Configuration instructions 270 relate to the aircraft's instantaneous aerodynamic configuration as determined by the high-lift devices, landing gear and speed brakes. The effect of any member of this group is the time evolution of the position of the associated components.

The first group (Group No. 11) of the configuration instructions 270 is the high lift configuration (HLC), and includes the instructions set high-lift devices (SHL) (Instruction No. 24), high-lift devices law (HLL) (Instruction No. 25) and hold high-lift devices (HHL) (Instruction No. 26).

The second group (Group No. 12) of the configuration instructions 270 is the speed brakes configuration (SBC), and includes the instructions set speed brakes (SSB) (Instruction No. 27), speed brakes law (SBL) (Instruction No. 28) and hold speed brakes (HSB) (Instruction No. 29).

The third group (Group No. 13) of the configuration instructions 270 is the landing gear configuration (LGC), and includes the instructions set open loop speed brakes (OLSB) (Instruction No. 30), landing gear (SLG) (Instruction No. 31) and hold landing gear (HLG) (Instruction No. 32).

As the configuration of the aircraft must be fully determined at all times, there must always be an active instruction from each of these groups (Group Nos. 11-13) of the configuration instructions 270.

The motion instructions 260 capture the flight control commands, guidance modes and navigation strategies that may be employed. The effect of a motion instruction is defined as a mathematical equation that unambiguously determines one of the degrees of freedom during the execution interval of the instruction. At any one instant, three motion instructions must be active to close the three degrees of freedom.

The motion instructions are classified into ten groups (Group Nos. 1-10) according to their effect, each group containing incompatible instructions as follows.
1. Speed guidance (SG) (Group No. 1).
    Includes speed law (SL) (Instruction No. 1) and hold speed (HS) (Instruction No. 2).
2. Horizontal speed guidance (HSG) (Group No. 2).
    Includes horizontal speed law (HSL) (Instruction No. 3) and hold horizontal speed (HHS) (Instruction No. 4).
3. Vertical speed guidance (VSG) (Group No. 3).
    Includes vertical speed law (VSL) (Instruction No. 5) and hold vertical speed (HVS) (Instruction No. 6).
4. Path angle guidance (PAG) (Group No. 4).
    Includes set path angle (SPA) (Instruction No. 7), path angle law (PAL) (Instruction No. 8) and hold path angle (HPA) (Instruction No. 9).
5. Local altitude guidance (LAG) (Group No. 5).
    Includes altitude law (AL) (Instruction No. 10) and hold altitude (HA) (Instruction No. 11).
6. Vertical positional guidance (VPG) (Group No. 6).
    Includes track vertical path (TVP) (Instruction No. 12).
7. Throttle control (TC) (Group No. 7).
    Includes set throttle (ST) (Instruction No. 13), throttle law (TL) (Instruction No. 14), hold throttle (HT) (Instruction No. 15) and open loop throttle (OLT) (Instruction No. 16).
8. Lateral directional control (LDC) (Group No. 8).
    Includes set bank angle (SBA) (Instruction No. 19), bank angle law (BAL) (Instruction No. 20), hold bank angle (HBA) (Instruction No. 21) and open loop bank angle (OLBA) (Instruction No. 22).
9. Directional guidance (DG) (Group No. 9).
    Includes course law (CL) (Instruction No. 17) and hold course (HC) (Instruction No. 18).
10. Lateral positional guidance (LPG) (Group No. 10).
    Includes track horizontal path (THP) (Instruction No. 23).

The information received relating to the aircraft intent (e.g., flight intent, operator preferences, pilot selections, flying procedures, etc.) may be mapped to the instructions in the groups above. For example, a manual input throttle control maps to the TC group (Group No. 7). Similarly, a pilot may select a climb-out procedure that contains both speed and flight path angle, thereby mapping to the VSG and PAG groups (Group Nos. 3 and 4), along with a bearing to maintain that maps to the LPG group (Group No. 10).

Seven rules govern the possible combinations of instructions, as follows.
1. An operation must have six instructions (follows from 3 and 4 below).
2. Each instruction must come from a different group (as members of the same group are incompatible).
3. One instruction must come from each of HLC, LGC and SBC (i.e., the configuration instruction groups, to define the configuration of the aircraft).
4. Three instructions must come from the following groups: DG, LPG, LDC, TC, SG, HSG, VSG, PAG, LAG and VPG (i.e., the motion instruction groups to close the three degrees of freedom).
5. One and only one instruction must come from DG, LPG and LDC (e.g., to avoid conflicting requirements for lateral motion).
6. Instructions from groups SG and HSG cannot be present simultaneously (e.g., to avoid conflicting requirements for speed).
7. Instructions from groups VSG, PAG, LAG and VPG cannot be present simultaneously (e.g., to avoid conflicting requirements for vertical speed, path angle and altitude).

The above lexical rules capture all the possible ways of unambiguously defining the aircraft trajectory prior to computing the trajectory. Consequently, an instance of aircraft intent that complies with the above rules contains sufficient necessary information to compute a unique aircraft trajectory.

Each aircraft intent instruction has an associated instruction interval. A pair of triggers control the start and finish of each instruction interval. These triggers may take different forms. For example, explicit triggers are divided into fixed and floating triggers. Implicit triggers, for example, are divided into linked, auto and default triggers.

Starting with the explicit triggers, a fixed trigger refers to a specified time instant for starting or ending an execution interval. For example, a pilot's decision to extend an aircraft's high lift devices at a particular time would be modelled as a set high lift devices instruction whose initial trigger condition would be fixed.

A floating trigger depends upon an aircraft state variable such as speed or altitude reaching a certain value to cause an execution interval to start or end. Similarly, the trigger may be prompted by a mathematical combination of state variables meeting a certain condition. An example would be a set throttle to a specific engine regime that would be invoked upon a certain speed being reached.

Turning now to implicit triggers, a linked trigger is specified in another instruction. In this way, a series of triggers may create a logically ordered sequence of instructions where the chain of start triggers is dependent upon the end trigger of the previous instruction. As such, a linked trigger points to an instruction rather than to a condition. Following on from the previous example of a set throttle to a certain regime triggered when a speed is reached, the subsequent instruction may be a hold throttle to the engine regime achieved and a linked trigger would start this instruction.

Auto triggers delegate responsibility for determining whether the conditions have been met to the trajectory computation engine using the aircraft intent description. Such an arrangement is needed when the conditions are not known at the intent generation time, and only become apparent at the trajectory computation time. An example is an aircraft tracking a VHF omnidirectional range (VOR) radial whose intent is to perform a fly-by at a constant bank angle so as to intercept another VOR radial. At the time of intent generation, there is no information on when to begin the turn. Instead, the information is computed by the trajectory computation engine (e.g., by iterating on different solutions to the problem). Hence the instruction set bank angle would have an auto trigger.

Default triggers represent conditions that are not known at intent generation, but are determined at trajectory computation because the conditions rely upon reference to the aircraft performance model. The above example of a set bank angle instruction had an auto start trigger, and will have a default end trigger that will be determined by the law that defines the time evolution of the aircraft's bank angle provided by the aircraft performance model.

Aircraft intent may be used to control an aircraft and/or to predict the aircraft's trajectory. An example system disclosed herein includes an aircraft that is flown using aircraft intent and an air traffic control system that predicts the aircraft's behaviour using (e.g., based on) aircraft intent.

An example aircraft 100 is illustrated in FIG. 2. In the illustrated example, the aircraft 100 includes aircraft sensors 110, a navigation system 120, a flight control system 130, aircraft actuators 140 and a memory 150. The aircraft 100 may be, for example, an airliner with an autopilot facility or an unmanned aerial vehicle (UAV).

In the illustrated example, the aircraft sensors 110 provide data relating to the position and attitude of the aircraft 100. The aircraft sensors 110 may include one or more of an altimeter, a pitot sensor, a Global Positioning System (GPS) receiver, a gyroscope, etc.

In the illustrated example, the navigation system 120 processes the data provided by the aircraft sensors 110 to determine the state of the aircraft 100 in terms of position and attitude to define the six degrees of freedom of the aircraft 100 (i.e., latitude, longitude, altitude, pitch, roll, and yaw). The navigation system 120 provides data indicative of the state of the aircraft to the flight control system 130. In the illustrated example, the memory 150 is configured to store aircraft intent instructions.

In the illustrated example, the aircraft actuators 140 control the flight of the aircraft 100. For example, the aircraft actuators 140 may control the deployment of the flaps and slats on the wings of the aircraft 100, the angle of the rudders and elevators on the empennage and/or the amount of thrust provided by the engines.

In the illustrated example, the flight control system 130 receives aircraft intent instructions from the memory 150 and state data from the navigation system 120. The flight control system 130 outputs control signals to the aircraft actuators 140 to control the aircraft 100 to carry out the aircraft intent instructions.

Figure 3:
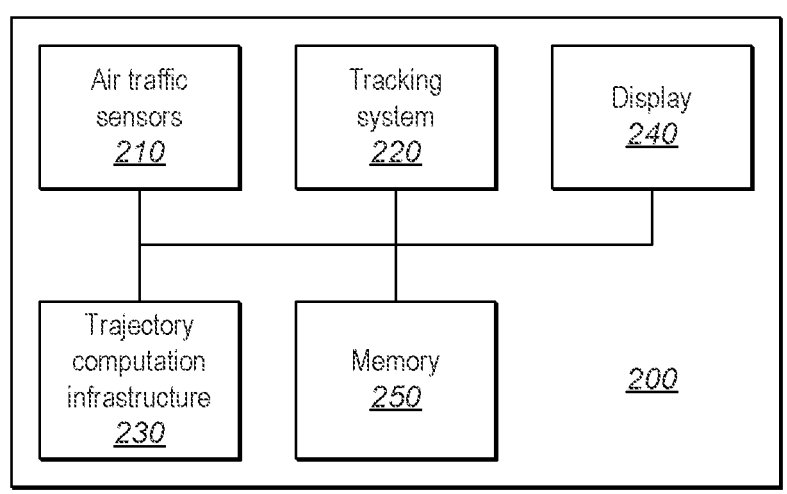
FIG. 3 illustrates an example schematic representation of an air traffic control system having an example trajectory computation infrastructure.

An example air traffic control system 200 is illustrated in FIG. 3. In the illustrated example, the air traffic control system 200 includes air traffic sensors 210, a tracking system 220, a trajectory computation infrastructure 230, and a memory 250.

In the illustrated example, the air traffic sensors 210 sense the position of one or more aircraft, such as the aircraft 100 of FIG. 2, in a predefined airspace. In some examples, the air traffic sensors 210 also measure the speed of the aircraft 100. Additionally or alternatively, the speed may be derived from the rate of change of measured position. The air traffic sensors 210 may include ground-based radar, etc.

In the illustrated example, the tracking system 220 tracks one or more aircraft, such as the aircraft 100 of FIG. 2, using data received from the air traffic sensors 210. The memory 250 is configured to store aircraft intent instructions.

In the illustrated example, the trajectory computation infrastructure 230 receives data on an aircraft's present location from the tracking system 220 and aircraft intent instructions from the memory 250, and uses the present location data and the aircraft intent instructions to predict the future trajectory of the aircraft 100.

In some examples, the future trajectory is output to a display 240. Additionally or alternatively, the predicted trajectory may be used in a conflict prediction method, which compares the predicted trajectories for a plurality of aircraft to determine the potential for future collisions. If any potential future collisions are detected, then a warning may be displayed or communicated to the aircraft, and/or appropriate redirecting of aircraft may follow.

In some examples, the processes of using the flight control system 130 to determine the correct actuator commands to carry out aircraft intent instructions, and using the trajectory computation infrastructure 230 to predict future aircraft trajectory is carried out using a single core process. The process, for example, includes the calculation of a residual representing the difference between the aircraft's measured or predicted state and the intended state dictated by the aircraft intent instructions (e.g., the residual may be a vector of residuals for each parameter of the state).

In the case of prediction using the trajectory computation infrastructure 230, the residual represents the difference between the aircraft state predicted by the numerical modelling of the flight of the aircraft and the intended state dictated by the aircraft intent instructions.

In the case of determining actuator commands using the flight control system 130, the residual may represent the difference between the aircraft state measured by the navigation system 120 and the intended state dictated by the aircraft intent instructions.

Each of the motion instructions 260 of FIG. 1 has an associated mathematical representation. For example, one of the aircraft intent instructions is Hold Altitude (HA) (Instruction No. 11). This may be represented as the difference between current altitude and the altitude when the instruction became/becomes active. This difference is an appropriate residual for the HA instruction. In some examples, the residual is a vector having a residual value for each instruction.

Figure 4:
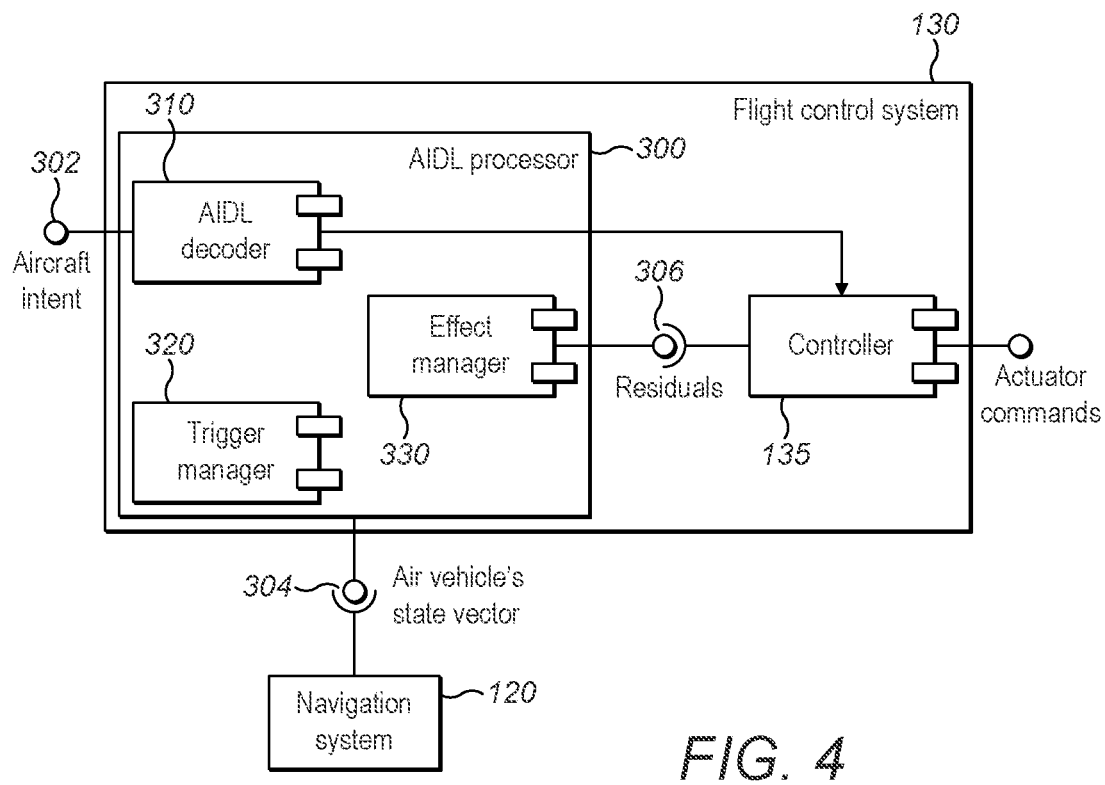
FIG. 4 illustrates the example flight control system of FIG. 2 for controlling an aircraft.

The example flight control system 130 is illustrated in FIG. 4. In the illustrated example, the flight control system 130 has an aircraft intent processor 300 and a controller 135. The processor 300 may be implemented as an Aircraft Intent Description Language (AIDL) processor. The controller 135 may be any form of control system, such as a proportional-integral-differential (PID) or proportional-differential (PD) controller.

In the illustrated example of FIG. 4, the aircraft intent processor 300 includes an aircraft intent input 302, an aircraft state input 304, and a residual output 306. The aircraft intent input 302 receives aircraft intent data representative of aircraft intent instructions. In the aircraft 100 of FIG. 2, the aircraft intent data is provided by the memory 150. The aircraft state input 304 receives state data representing the state of an aircraft. In the aircraft 100, this data is provided by the navigation system 120.

In the illustrated example, the processor 300 compares the state data with the aircraft intent data to determine the residual. The residual output 306 provides a signal to the controller 135. The controller 135 implements a control system to control the aircraft actuators 140 to minimise the residual.

In the illustrated example, the aircraft intent processor 300 includes an AIDL decoder 310, a trigger manager 320, and an effect manager 330. These components have the same functionality whether they form part of the flight control system 130 or the trajectory computation infrastructure 230.

In the illustrated example, the AIDL decoder 310 receives aircraft intent data from the aircraft intent input 302 and processes (e.g., converts) the intent data to a form that can be executed by the effect manager 330. In some examples, the AIDL decoder 310 is arranged to validate the received aircraft intent data. This may be achieved, for example, by checking that the aircraft intent data complies with a set of rules, such as the seven rules described above.

In the illustrated example, the trigger manager 320 receives state data from the aircraft state input 304 and processes the received state data to determine when the triggers encoded in one or more of the aircraft intent instructions have been achieved. The effect manager 330 applies error metrics to determine the residual to be output by the processor 300 via the residual output 306. For example, in a scenario where each aircraft intent instruction has associated therewith a mathematical representation, the error metrics may be used in the effect manager 330 to calculate the residual for each instruction. The residual output 306 may be a vector of values indicating the residual for each instruction.

Figure 5:
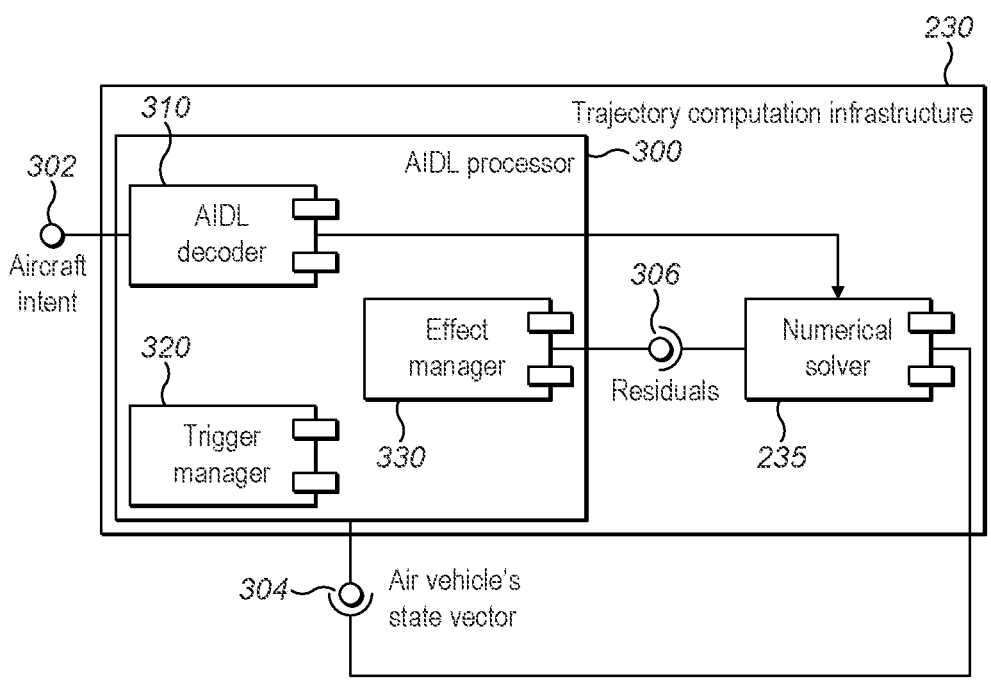
FIG. 5 illustrates the example trajectory computation infrastructure for monitoring aircraft.

The example trajectory computation infrastructure 230 is illustrated in FIG. 5. In the illustrated example, the trajectory computation infrastructure 230 includes the aircraft intent processor 300 and a numerical solver 235.

In the illustrated example, the aircraft intent processor 300 is the same as that employed in the flight control system 130, as illustrated in FIG. 4. The aircraft intent input 302 receives aircraft intent data representative of aircraft intent instructions. In the air traffic control system 200 of FIG. 3, the aircraft intent data is provided by the memory 250. The aircraft state input 304 receives state data representing the state of an aircraft. In the air traffic control system 200, the state data is provided by the numerical solver 235.

In the illustrated example, the processor 300 compares the state data with the aircraft intent data to determine the residual. The residual output 306 provides a signal to the numerical solver 235. The numerical solver 235 evaluates the equations of motion for the aircraft 100 using the Earth model and aircraft performance model described herein. The numerical solver 235 predicts the behaviour of the aircraft 100 using inputs of both the aircraft intent description described above and also the most recent known state of the aircraft provided by the tracking system 220. The numerical solver 235 provides as an output a prediction of the aircraft state following the execution of the received aircraft intent instructions given the most recently known state.

The aircraft performance model provides the values of the aircraft performance aspects required by the numerical solver 235 to integrate the equations of motion. These values depend on the aircraft type for which the trajectory is being computed, the aircraft's current motion state (e.g., position, velocity, weight, etc) and/or the current local atmospheric conditions. In addition, the performance values may depend on the intended operation of the aircraft, i.e. on the aircraft intent. For example, the numerical solver 235 may use the aircraft performance model to provide a value of the instantaneous rate of descent corresponding to a certain aircraft weight, atmospheric conditions (e.g., pressure, altitude and temperature) and intended speed schedule (e.g., constant calibrated airspeed). The numerical solver 235 may also request from the aircraft performance model the values of the applicable limitations to ensure that the aircraft motion remains within the flight envelope. The aircraft performance model is also responsible for providing the numerical solver 235 with other performance-related aspects that are intrinsic to the aircraft, such as flap and landing gear deployment times.

The Earth model provides information relating to environmental conditions, such as the state of the atmosphere, weather conditions, gravity and magnetic variation. The numerical solver 235 uses the inputs, the aircraft performance model and the Earth model to solve the set of equations of motion. Many different sets of equations of motion are available that vary in complexity, and which may reduce the aircraft's motion to fewer degrees of freedom by means of a certain set of simplifying assumptions.

Figure 6:
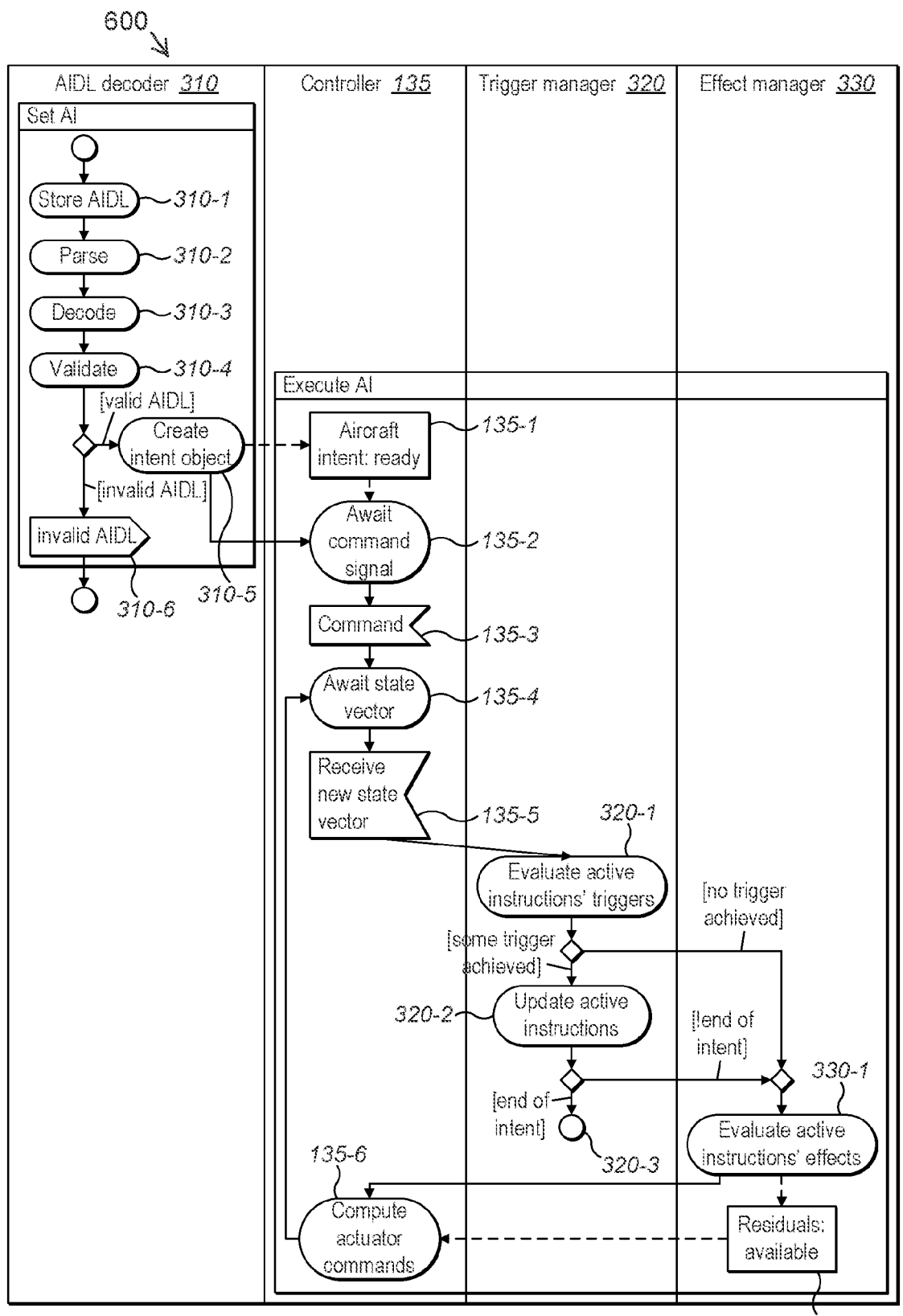
FIG. 6 is a flow chart representative of an example method of controlling an aircraft that may be implemented by the example flight control system of FIG. 4.

FIG. 6 illustrates a flow chart representative of an example method 600 of controlling an aircraft using the flight control system 130 of FIG. 4. The flight control system 130 may form part of the aircraft 100 of FIG. 2.

In the illustrated example, the AIDL decoder 310 receives aircraft intent data and decodes it into the correct form. The AIDL decoder 310 receives aircraft intent data (block 310-1). In some examples, the aircraft intent data is received in a serialised form and stored by the AIDL decoder 310. In the illustrated example, the AIDL decoder 310 parses the received and stored aircraft intent data to identify the AIDL instructions (block 310-2) and decodes the parsed AIDL instructions (block 310-3). In some examples, the AIDL decoder 310 checks or verifies that the AIDL instructions are valid (block 310-4) (e.g., by checking that the instructions comply with the seven rules described above). If there is an error in the AIDL instructions (e.g., as determined at block 310-4), the AIDL decoder 310 may flag that there is an error (block 310-6). If the AIDL instructions are valid (e.g., as determined at block 310-4), the AIDL decoder 310 creates an AIDL intent object (block 310-5), which represents all of the aircraft intent instructions encoded in the received aircraft intent data.

In the illustrated example, once the AIDL decoder 310 has decoded the aircraft intent data into the correct form, the AIDL decoder 310 notifies the controller 135 that the aircraft intent is ready for execution (block 135-1). The controller 135 waits for a command signal to commence execution of the aircraft intent instructions (block 135-2). Once a command is received by the controller 135 (block 135-3), the controller awaits aircraft state data from the aircraft state input 406 (block 135-4).

In the illustrated example, the navigation system 120 communicates aircraft state data to the aircraft state input 304, and the aircraft state input 304 provides this data to the controller 135 (block 135-5). The aircraft state data is sent to the trigger manager 320. In the illustrated example, the trigger manager 320 evaluates whether one or more of the trigger conditions associated with the presently active aircraft intent instruction has been achieved (block 320-1).

Initially, the active aircraft intent instructions are the first instructions in the AIDL object (e.g., the set of the first instructions that close all of the degrees of freedom of the aircraft 100 of FIG. 2). As the trigger conditions are met, the subsequent instructions become valid in order.

In the illustrated example, if any one of the trigger conditions is met, the active aircraft intent instructions are updated (block 320-2). For example, this could mean that the aircraft intent instruction for one of the configurations or motions is replaced with the next instruction for that configuration or motion.

In the illustrated example, if there are further instructions available, the method 600 proceeds to the effect manager 330. Otherwise, all available aircraft intent instructions have been completed (block 320-3).

In the illustrated example, if none of the trigger conditions have been achieved, the example method 600 proceeds directly to the effect manager 330. The effect manager 330 evaluates the effect of the aircraft intent instruction (block 330-1). In some examples, each aircraft intent instruction has associated therewith an error metric, which may be used to calculate a residual. The residual indicates how closely the aircraft state matches that instructed by the aircraft intent instructions. In some examples, the effect manager 330 evaluates the residual using the error metric associated with the instruction and the aircraft state vector.

In the illustrated example, the residuals are available for use by another component of the system (block 330-2). The example method 600 moves back to the controller 135. The controller 135 computes the appropriate actuator commands (block 135-6) to reduce the residual made available at block 330-2. The actuator commands may be used to actuate the actuators 140 of the aircraft 100 of FIG. 2.

Figure 7:
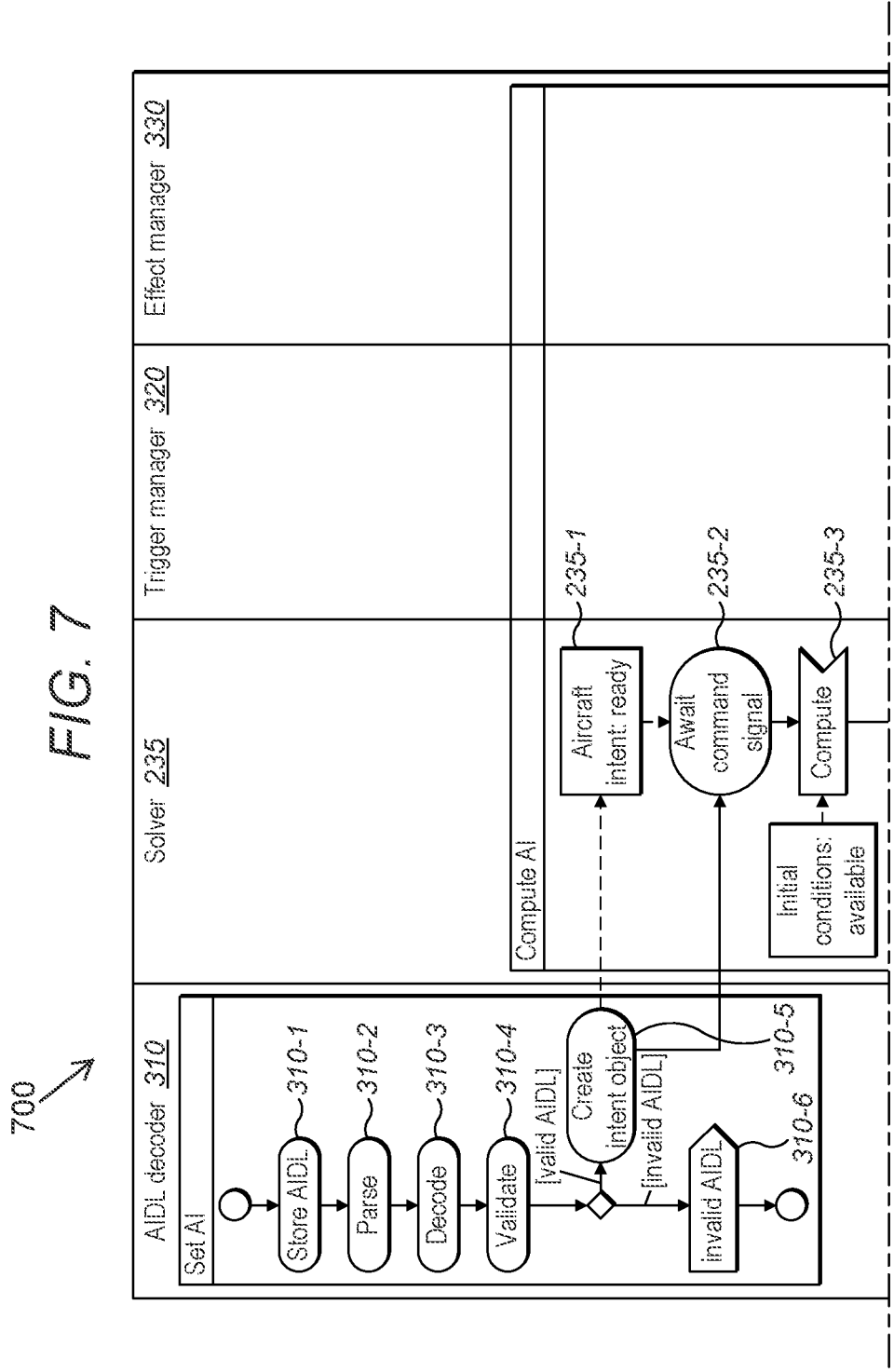
FIG. 7 is a flow chart of an example method of computing the trajectory of an aircraft that may be implemented by the example trajectory computation infrastructure of FIG. 5.
Figure 7:
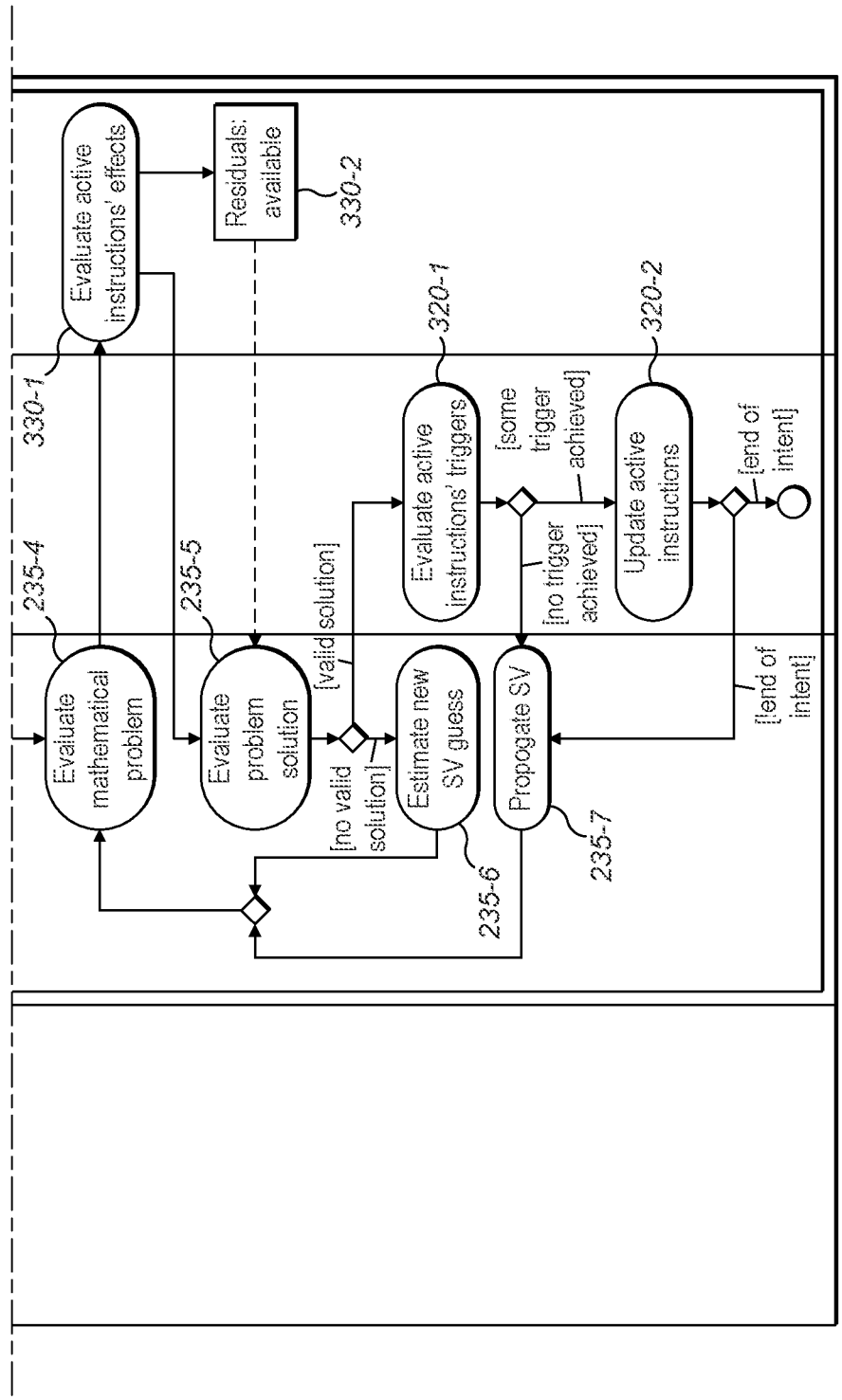

FIG. 7 illustrates a flow chart representative of an example method 700 of computing the trajectory of an aircraft using the trajectory computation infrastructure 230 of FIG. 5. The trajectory computation infrastructure 230 may form part of the air traffic control system 200 of FIG. 3.

In the illustrated example, the portions of the method 700 carried out by the AIDL decoder 310, the trigger manager 320 and the effect manager 330 are substantially the same as in the example method 600 of FIG. 6. The difference between the method 600 and the method 700 is the action of the numerical solver 235 instead of the controller 135.

In the illustrated example of FIG. 7, blocks 310-1 through 310-6 are the same as in the example method 600 of FIG. 6 and provide the aircraft intent instructions.

In the illustrated example, once the AIDL decoder 310 has decoded the aircraft intent data into the correct form, the AIDL decoder 310 may notify the numerical solver 235 that the aircraft intent is ready for execution (block 235-1). The numerical solver 235 waits for a command signal to commence computation of the aircraft trajectory based on the aircraft intent instructions (block 235-2). The numerical solver 235 awaits the initial conditions from which the aircraft trajectory will be derived (block 235-3). The initial conditions may be provided, for example, by the air traffic sensors 210 of FIG. 3.

In the illustrated example, the numerical solver 235 evaluates the equations of motion using the aircraft state and the presently active aircraft intent instruction (block 235-4). This step results in the computation of errors indicating how well the aircraft state fits the equations of motion.

Initially, the aircraft state is defined by the initial conditions. Subsequently, the method 700 proceeds iteratively by evaluating the equations of motion using the predicted aircraft state.

The operations at blocks 330-1 and 330-2 are performed the same as in FIG. 6 and are implemented by the processor 300 to determine the residuals based on the aircraft state and the active aircraft intent instruction.

Using the residuals, the numerical solver 235 determines whether the predicted aircraft state is a valid solution to the equations of motion (block 235-5) using the calculated errors from block 235-4 of how well the aircraft state fits the equations of motion, the calculated residuals from block 330-1 and the aircraft intent instruction. For example, the set of errors (from block 235-4) and residuals (from block 330-1) can be compared with a set of corresponding thresholds such that the predicted aircraft state is found to be a valid solution if every error is less than its corresponding threshold.

In the illustrated example, if the predicted state is determined to be not valid (block 235-5), a new estimate is generated (block 235-6). In some examples, the new estimate may be generated by making a small random adjustment to the predicted state found to be invalid.

In the illustrated example, if the predicted state is determined to be valid (block 235-5), then the trigger manager 320 is used to implement method at blocks 320-1 and 320-2, which are performed the same as in FIG. 6, =to establish whether any of the trigger conditions associated with the active aircraft intent instruction has been achieved and to update the active aircraft intent instruction if necessary.

In the illustrated example, a new state estimate is generated (block 235-6). This may be done using any optimisation method known in the art, for example by gradient descent or by a Newtonian method.

The validated predicted state is used to estimate the next state in the predicted aircraft trajectory (block 235-7), and the example method 700 returns to block 235-4.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method of predicting a trajectory of an aircraft using a trajectory computation infrastructure including an aircraft intent processor, the method comprising:
   receiving, with the aircraft intent processor, aircraft intent data representative of aircraft intent instructions;
   receiving, with the aircraft intent processor, state data representative of a state of the aircraft;
   calculating, with the aircraft intent processor, residual data representative of an error between a state of the aircraft commanded by the received aircraft intent data and the state of the aircraft expressed by the received state data, the aircraft intent processor including an effect manager, wherein the calculating of the residual data includes:
      determining, with the effect manager, an error metric from one of the aircraft intent instructions represented by the aircraft intent data; and
      evaluating, with the effect manager, the error metric using the state of the aircraft commanded by the received aircraft intent data and the state of the aircraft expressed by the received state data to calculate the residual data;
   outputting, with the aircraft intent processor, the residual data;
   determining, with the trajectory computation infrastructure, a predicted trajectory of the aircraft;
   comparing the predicted trajectory to one or more other predicted trajectories of one or more other aircraft; and
   presenting a warning on a display if a potential future collision is detected.

2. The method of claim 1, wherein the aircraft intent processor further includes a trigger manager, and the method further includes:

receiving, with the aircraft intent processor, aircraft intent data representative of trigger conditions for indicating when a corresponding one of the aircraft intent instructions has been executed; and determining, with the trigger manager, whether the state data received by the aircraft intent processor fulfils one of the trigger conditions.

3. A method of controlling an aircraft using an aircraft intent processor, the method comprising:

receiving, with the aircraft intent processor, aircraft intent data representative of aircraft intent instructions;

receiving, with the aircraft intent processor, state data representative of a state of the aircraft;

calculating, with the aircraft intent processor, residual data representative of an error between a state of the aircraft commanded by the received aircraft intent data and the state of the aircraft expressed by the received state data, the aircraft intent processor including an effect manager, wherein the calculating of the residual data includes:

determining, with the effect manager, an error metric from one of the aircraft intent instructions represented by the aircraft intent data; and evaluating, with the effect manager, the error metric using the state of the aircraft commanded by the received aircraft intent data and the state of the aircraft expressed by the received state data to calculate a residual;

outputting, with the aircraft intent processor, the residual data;

monitoring the state of the aircraft with a navigation system of the aircraft to provide the state data to the aircraft intent processor;

outputting a control signal to an actuator based on the residual data; and controlling the actuator with the control signal.

4. The method of claim 1, wherein the trajectory computation infrastructure includes a numerical solver, and the method further includes:

providing an initial state of the aircraft to the numerical solver;

providing the residual data to the numerical solver; and generating, with the numerical solver, the state data representing the state of the aircraft based on the residual data output by the aircraft intent processor.

5. The method of claim 4, wherein receiving the state data is performed using the initial state of the aircraft and is subsequently performed using the state data generated by the numerical solver.

6. The method of claim 4, wherein the numerical solver generates the state data based on an aircraft performance model that provides values of aircraft performance aspects.

7. The method of claim 6, wherein the values of aircraft performance aspects are based on at least one of a type of the aircraft, a current motion state of the aircraft, or a current local atmospheric condition.

8. The method of claim 6, wherein the numerical solver generates the state data further based on an Earth model that provides information relating to environmental conditions.

9. The method of claim 4, further including monitoring the state of the aircraft with a tracking system to provide the state data to the aircraft intent processor.

10. The method of claim 9, wherein the tracking system includes a ground-based radar.

11. The method of claim 4, further including presenting the predicted trajectory on a display.

12. The method of claim 1, wherein the aircraft intent processor includes an aircraft intent description language (AIDL) decoder, and the method further includes:

comparing the aircraft intent data to a set of rules; and validating the aircraft intent data based on the comparison.

13. The method of claim 1, wherein the aircraft is an unmanned aerial vehicle (UAV).

14. A method including:

controlling an aircraft using a first aircraft intent processor by:

receiving aircraft intent data representative of aircraft intent instructions;

receiving first state data representative of a first state of the aircraft;

calculating first residual data representative of a first error between a state of the aircraft commanded by the received aircraft intent data and the first state of the aircraft expressed by the first state data; and outputting the first residual data to a controller of the aircraft; and determining, using a trajectory computation infrastructure including a second aircraft intent processor, a predicted trajectory of the aircraft by:

receiving, with the second aircraft intent processor, the aircraft intent data;

receiving, with the second aircraft intent processor, second state data representative of a second state of the aircraft;

calculating, with the second aircraft intent processor, second residual data representative of a second error between the state of the aircraft commanded by the received aircraft intent data and the second state of the aircraft expressed by the second state data;

outputting, with the second aircraft intent processor, the second residual data;

determining, with the trajectory computation infrastructure, a predicted trajectories of one or more other aircraft and presenting a warning on a display if a potential future collision is detected.

15. The method of claim 14, further including monitoring, with a navigation system of the aircraft, the first state of the aircraft and providing the first state data representative of the first state of the aircraft to the first aircraft intent processor.

16. The method of claim 15, further including controlling, via the controller, an actuator of the aircraft based on the first residual data.

* * * * *

UNITED STATES PATENT AND TRADEMARK OFFICE
CERTIFICATE OF CORRECTION

PATENT NO. : 10,041,809 B2
APPLICATION NO. : 15/499638
DATED : August 7, 2018
INVENTOR(S) : Francisco Navarro et al.

Page 1 of 1

It is certified that error appears in the above-identified patent and that said Letters Patent is hereby corrected as shown below:

In the Claims

Column 14, Lines 46-48 (Claim 14):
Replace
"determining, with the trajectory computation infrastructure, a predicted trajectories of one or more other aircraft and"
With
"determining, with the trajectory computation infrastructure, a predicted trajectory of the aircraft; comparing the predicted trajectory to one or more other predicted trajectories of one or more other aircraft; and"

Signed and Sealed this
Twenty-eighth Day of May, 2019

Andrei Iancu
*Director of the United States Patent and Trademark Office*